May 16, 1950     E. F. TUTTLE     2,507,838
FOOD MACHINE

Filed March 19, 1945     3 Sheets-Sheet 1

INVENTOR
Eugene F. Tuttle
By Earl E. Moore
ATTY.

May 16, 1950      E. F. TUTTLE      2,507,838
FOOD MACHINE
Filed March 19, 1945      3 Sheets-Sheet 2
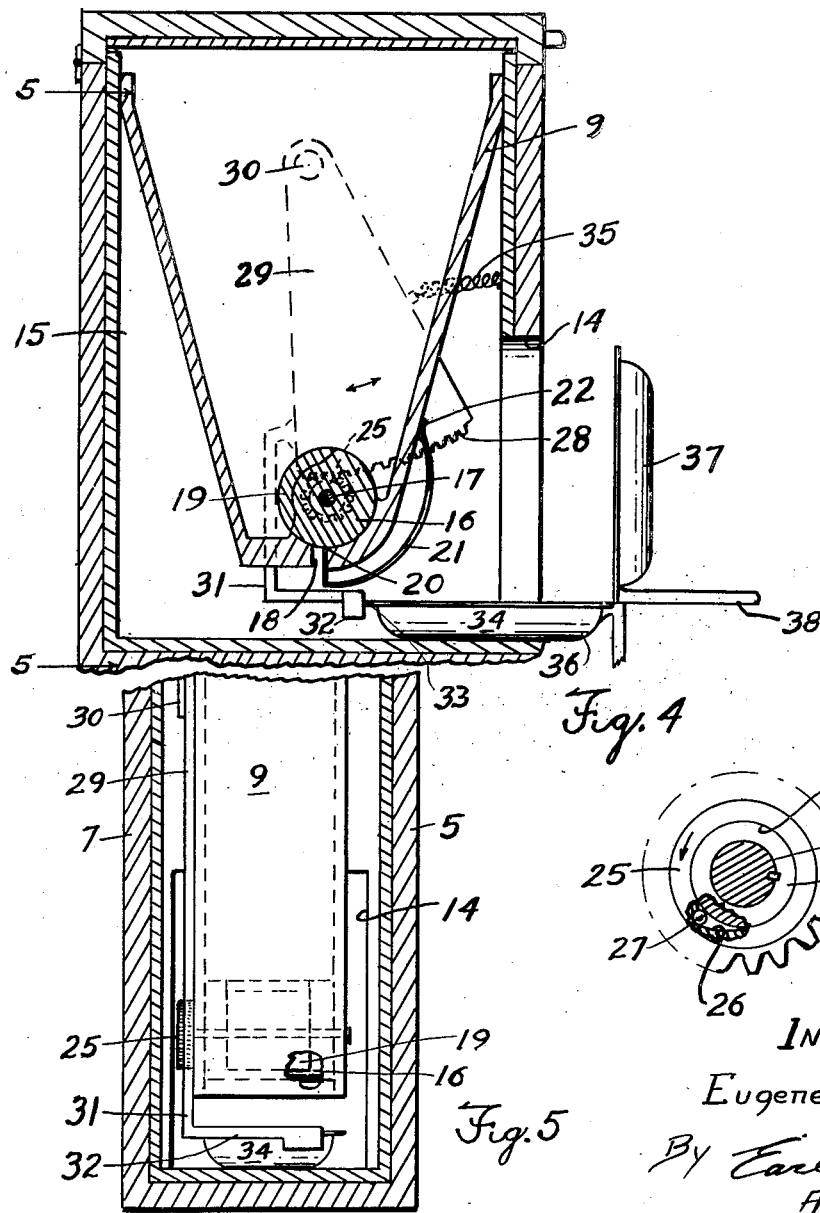
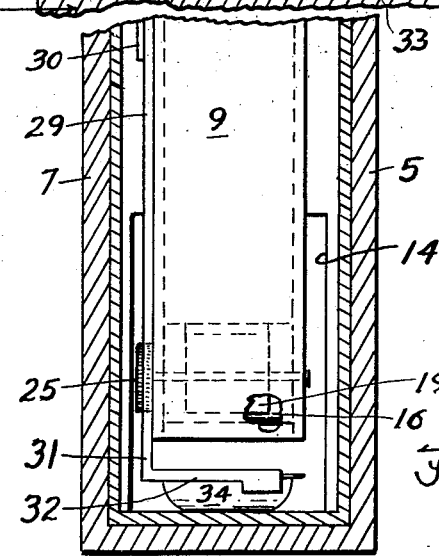
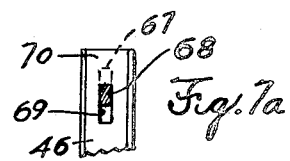
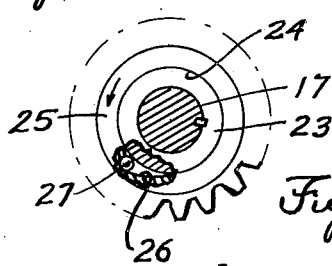
INVENTOR
Eugene F. Tuttle
By Earl E. Moore
ATTY.

May 16, 1950      E. F. TUTTLE      2,507,838
FOOD MACHINE

Filed March 19, 1945      3 Sheets-Sheet 3

INVENTOR
Eugene F. Tuttle
By Earl E. Moore
ATTY.

Patented May 16, 1950

2,507,838

UNITED STATES PATENT OFFICE 2,507,838

FOOD MACHINE

Eugene F. Tuttle, North Hollywood, Calif.

Application March 19, 1945, Serial No. 583,535

3 Claims. (Cl. 99—327)

This invention relates to means and ways of producing an entire sandwich and in cooking the sandwich parts to their proper and desired condition upon order to the satisfaction of the diner while he waits.

The means and method consist in cooking the filler or meat portion of the sandwich and also the dough portion between which the filler portion is placed, and all this is accomplished in a clean and sanitary manner without touching the food portions of the sandwich by human hands. The means includes an attractive cabinet or case in which all the operations are performed, the cabinet or case being suitable for placing upon a table or counter, or in the show window of the food service establishment.

The filler or meat portion of the sandwich is first automatically cooked to order, and then the dough is positioned on either side of the filler and the entire sandwich placed in a baker chamber where the dough is baked to order automatically. A plurality of filler and dough cookers are provided so that quick service can be obtained in a minimum of time for any reasonable number of orders.

One of the principal objects of this invention is to present a new and novel means for producing sandwiches and the like upon short order by a device that is simple and sturdy in construction, automatically timed, and a device that is economical to make and manufacture.

Another object is to provide a sandwich making and cooking device that cooks all the essential parts of the sandwich without the necessity of human hands touching any part of the food.

Other objects, advantages and features of my invention will appear from the accompanying drawings, the subjoined detailed description, the preamble of these specifications and the appended claims.

Applicant is about to illustrate and describe one of the forms of this invention in order to teach one how to make and use the same, but it is to be understood that the drawings and description thereof are not to limit the invention in any sense whatsover, except as limited by the appended claims.

Figure 1:
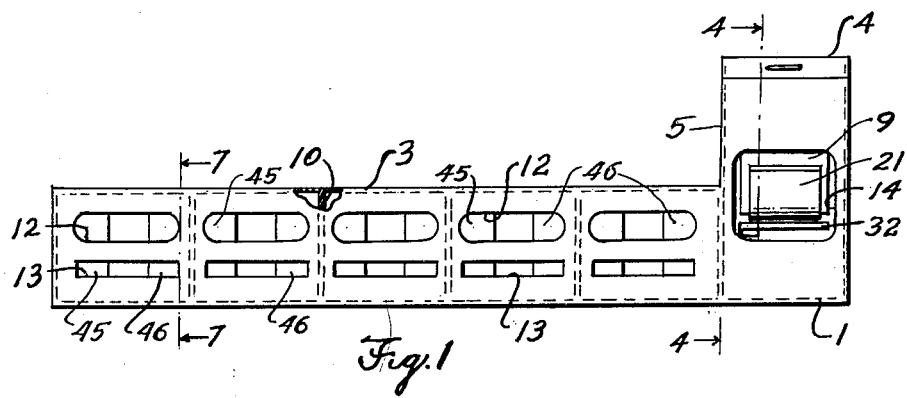
Fig. 1 shows the invention in front elevational view.
Figure 2:
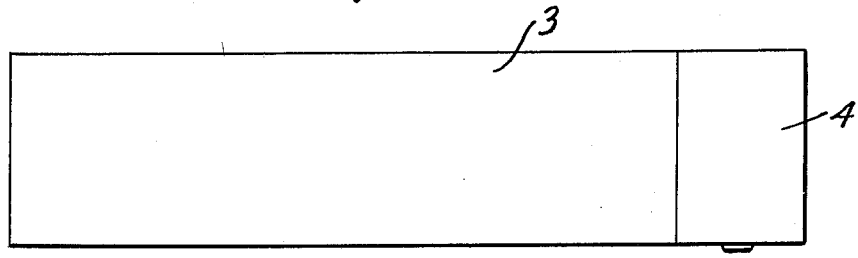
Fig. 2 is a top plan view of Fig. 1.
Figure 3:
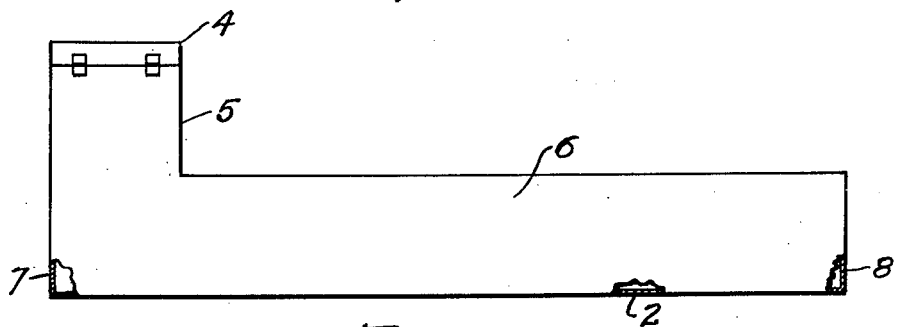
Fig. 3 is a rear elevational view of the device shown in Fig. 1.
Figure 7:
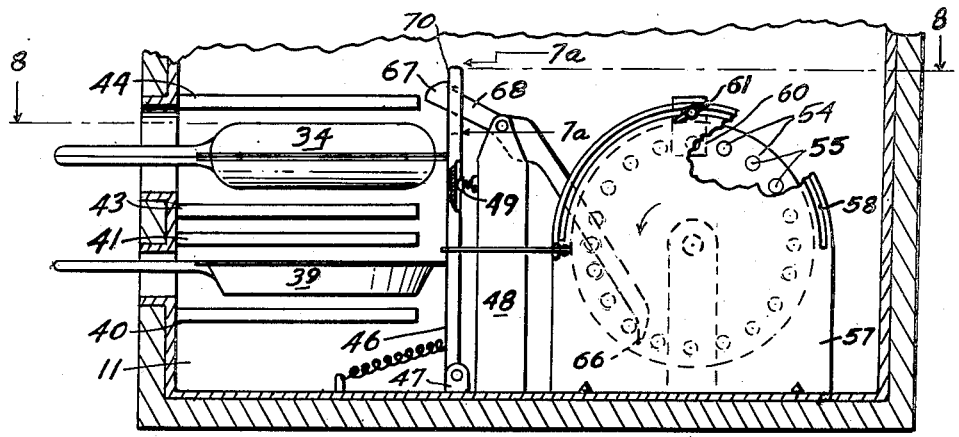
Figure 8:
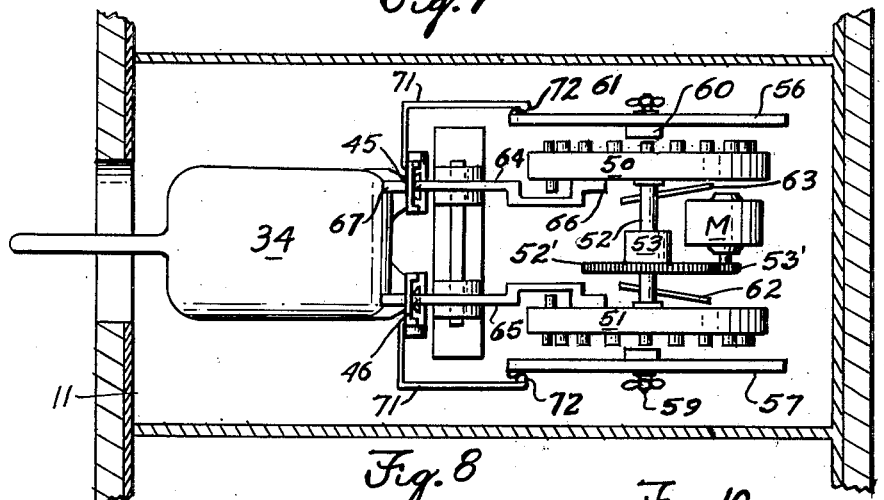
Figure 10:
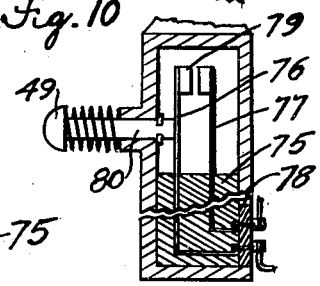
Figures 9, 11:
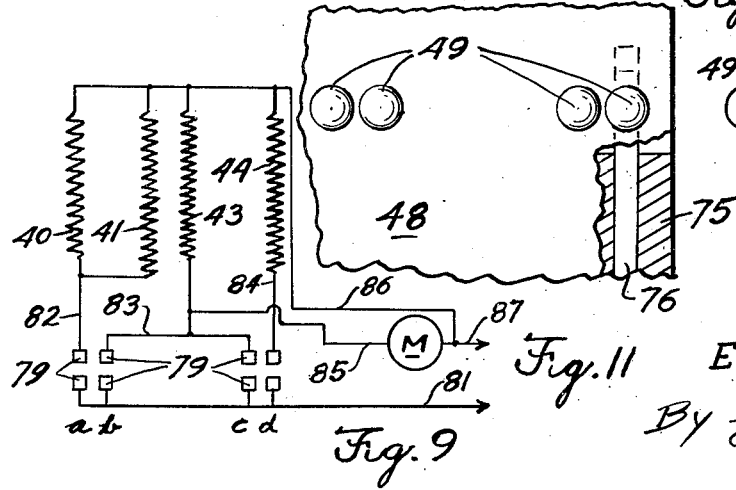

Fig. 4 is a sectional view taken substantially along the line 4—4 of Fig. 1, but on a larger scale, Fig. 5 is a sectional view taken substantially along the line 5—5 of Fig. 4, Fig. 6 is an enlarged elevational view, partly in section, showing an automatic clutch device used in the invention, Fig. 7 is a view taken substantially along the line 7—7 of Fig. 1, Fig. 7a is a view of a portion of a lever taken substantially along the line 7a—7a of Fig. 7, Fig. 8 is a plan view, partly in section, of Fig. 7, Fig. 9 is a schematic circuit arrangement for the heating elements and motor employed in the invention, Fig. 10 is a separated sectional view of a switching unit employed in the invention, and Fig. 11 is an elevational view of the switch unit with parts broken away.

The outer casing or cabinet for the sandwich making device illustrated, comprises a front wall 1, bottom wall 2, top walls 3 and 4 joined by the short vertical wall 5, rear wall 6, and the two end walls 7 and 8. The top wall 7 is provided with hinges and a handle as well as depending side flanges so that this wall makes a good seal but can be opened to enable a workman to have access to an open top dough bin 9. The elongated lower portion of the cabinet is divided into a plurality of chambers 11 by a plurality of vertical partitions 10, each chamber having an upper opening 12 and a relatively smaller and lower opening 13 at the front of the cabinet, and the higher portion of the cabinet has a single large opening 14, as shown.

The chambers 11, as well as a bin chamber 15, are lined with a suitable porcelain or equivalent sheeting so as to make it easy to clean the interior of the device and thus keep it sanitary. The dough bin 9 is shaped, as shown, and at the bottom thereof has a roller 16 which is keyed to a shaft 17, the ends of which shaft are journalled in the lower side walls of the bin. On the bottom of the bin there is an opening 18 in the form of a slot which receives and conducts dough from the bin via of a recessed portion 19 in the roller. This recessed portion may be termed a pocket since it holds a charge of dough. This charge of dough is removed from the roller by the horizontal scraper edge 20 at the end of the curved ribbon spring 21. The upper end of the spring is soldered or otherwise securely fixed to the front side of the bin 9 at 22, and the spring is sprung so that the scraper edge 20 always and positively engages the lower surface of the roller and especially the recessed arcuate surface of the pocket when it is passing by the slot opening 18. The approach and tail ends of the pocket are declined and inclined respectively so that the scraper rides into and out of the pocket in cam-fashion.

Keyed to the shaft 17 is a collar 23 which snugly bears upon and rides within the circular surface 24 of a gear member 25. This gear member is provided with a curved recessed portion 26, shaped as shown, in which is a free rolling ball 27, this ball always rolling toward the narrow portion of the recess when the gear member is in position to receive motion from the toothed and curved rack 28 to which it is meshed. The curved rack is attached to the lower end of the quadrant-like element 29 that is pivoted to one side of the bin at 30. Attached to the rear edge of the element 29 is a right-angle shaped arm 31 having at its distal end a horizontal bar 32 which is adapted to be engaged by the extended flange 33 of a pan 34 or any one of a number of such pans, or any other type of pan that can be used in a device of this nature.

The above related arrangement operates as follows when there is properly mixed and textured bread dough in the bin 9: The pan 34 is inserted through the opening 14 and the extension 33 thereof made to engage the bar 32, the pan is then pushed further into the chamber until stopped by the angled arm 31 engaging the rear lining of the chamber or any suitable stop. During this action, the element 29 is forced to the rear and forces the roller 16 to rotate a complete revolution because of the ball 27 action within the clutch device 23—25. The dough within the pocket 19 is then freed therefrom by the scraper 20 as the roller turns, and the slab or piece of dough falls into the pan. When the pan or carrier 34 is removed with the slab of dough therein, the element 29 returns to its original position, as shown in Fig. 4, by the spring 35. When the rack makes its return trip, the gear 25 is unaffected because the ball 27 of the clutch rotates only in the deep portion of its recessed track. This action is repeated as often as the pan is inserted entirely within the chamber.

The pan 34 is of the cover type and has the base section 36 and the lid portion 37, the lid being hinged to the handle 38 so that the lid will automatically close when released from the operator's hands. Although this type of pan may be used for all purposes of this invention, it is preferred to employ an open pan or carrier 39, see Fig. 7, for the cooking of the sandwich filler, which filler in most cases would undoubtedly be some kind of meat, and in the case of hamburgers the meat would be of the ground type formed into a slab or patty.

The cooking chambers 11 are alike, each being provided with the electric heating elements or units 40, 41, 42 and 43 which have their vertical side edges supported in any suitable manner from the front and side walls of the chamber. Each of the elements 40 and 43 may be of 300 watts capacity and the other two of 200 watts each as it is desired to have the greatest heat supply below the pans, but these units may be varied as desired. Between the heating units there are guide rails fixed to the side walls of each chamber for removably supporting the pans 34 and 39 by their side flanges in the usual and well known manner.

Rearwardly of the electric heating elements there are upstanding levers 45 and 46, each of which is pivoted at its lower end to bearing blocks 47 that are attached to the floor of the chamber. Rearward of the levers is an electric switch box 48 that is fixed to the floor of the chamber and which has a plurality of push-buttons 49 extending therefrom, the details of which will be explained later.

Behind the switch box, there are the timer wheels or discs 50 and 51 which are keyed to their common shaft 52, the shaft being supported in the floor supported bearing member 53. The shaft is driven by the connected gear and motor unit M. These wheels 50 and 51 each have a plurality of concentric bores with sleeves 54 therein, the sleeves providing guide elements for bullet-like plungers 55 which are adapted to be pushed part way through their respective sleeves when forced to do so by the side time-setting plates 56 and 57. These plates are hinged to the floor of the chamber so that they can be swung toward their respective timer-wheels. Each plate has at the top half thereof an elongated curved perimetrical slot 58 along which rides a pin 59 that has fixed to one end thereof a shiftable block 60 which is adapted to engage any one of the numerous plungers 55. The pins 59 are threaded and engaged by the wing-nuts 61 so that the blocks can be set in predetermined positions upon the plates. For returning the plungers to position after operation of the timer wheel or wheels, the inclined plates 62 and 63 are provided which are fixed to the floor of the chamber, these plates acting as a cam-rider for any plunger that may be protruded on the inner sides of the wheels.

Spaced apart latching levers 64 and 65 are pivoted on bearing blocks atop the switch box, these levers are configurated as shown, one long arm thereof having a dog 66 and the other end being in the form of a short arm 68 with a detent 67. The levers 45 and 46 each have a slot 69 at their top end, see Fig. 7a, to accommodate the short arm 68 and to provide a catch portion 70 for the detent 67, as this detent holds the lever against the buttons 49 until released by one of the plungers striking the dog 66 and raising the long arm so as to lower the short arm and cause the detent to unlatch from the lever part 70. When the lever is so released, it opens all the switches on its side of the switch box 48 and gives the pan or pans a slight forward push to indicate to the operator that the thing in the pan is cooked in accordance to the time set.

For causing the plates 56 and 57 to move toward their respective time-wheels so as to set their respective plungers, each lever has fixed thereto, as by welding or soldering, a bent arm 71 having the button 72 fixed to the distal end thereof. A similar button 73 is fixed to the near edge of each plate and in alinement with their respective arms so that the buttons of the arms ride over their companion buttons on the plates, and when this happens, the plate or plates are forced toward their respective time-wheels for movement of their respective time-setting blocks 60 for engagement with a plunger on the wheel.

Fig. 9 schematically shows the electric connections and Fig. 10 shows one form of construction for the switching device within the box 48. The switching unit has within its casing an insulating block 75 which supports all the upright conductor bands 76 and 77 for each button, the bands having their outlet through an insulated rear plate 78. At the top ends of the bands are the contactors 79, one for each band, which close the circuits of which they are a part. The front band of each switch is attached to one of the buttons as by means of screws or any other suitable means.

By reference to Fig. 9, the various circuits can be easily traced. One side of all the switches are connected to the feed wire 81 which makes connection with the high side, or live side, of any suitable source of electric current, such as for instance, 60 cycle alternating house lighting current of 115 volts. The first switch $a$ has its low side connected with the first heating element 40 by the wire 82, and a branch wire connects this same side of the same switch with one end of the heating element 41. A jumper wire 83 connects the two low side contacts of switches $b$ and $c$ with one end of the heating element 43, and wire 84 connects the low side of switch $d$ with the heating element 44. The low side contacts of switches $b$ and $c$ have connection with the motor M via of wire 85. Wire 86 connects all the low side ends of the heating elements to the other side of the supply at 87. The motor is a slow speed electric motor of any suitable make, but of sufficient power to easily drive the shaft 52 through the gears 52' and 53', these gears being proportioned so that the timer wheels 50 and 51 are rotated at the speed of one revolution per four minutes. Since there are twenty plungers, each plunger would be just twelve time-space seconds from its neighbor, therefore, since dog 66 can be made to rise at any twelve set intervals less than four minutes, sufficient time is allowed for the cooking and baking of the sandwich parts.

It should now be apparent, that the blocks 60 are first set by the operator and the current switch turned on. Block 60 will set the proper plunger to release the levers 45 and 46 at the proper time when the sandwich should be cooked. Release of the levers will shove the pan or pans outwardly and thus indicate to the operator that the sandwich or/and meat therein is done.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a cooker device having a compartment with a heating unit and a doorway thereto, a lever means exposed to the compartment and adapted to be shifted when the thing to be heated is injected into the compartment, the lever means having a hinge means attaching the lever means to a wall of the device and spring means constantly urging the lever means toward the thing to be heated, a timer wheel spaced from and rearwardly of the lever means, a slow speed motor means for driving the wheel at a predetermined rate of speed, a plurality of timer pins around the periphery of the wheel, a switch means near the lever means which controls the operation of the heating unit and the motor means, contact means on the switch means and the lever means which is adapted to close the switch means when the lever means is at its rearwardmost position, and pivoted rod means having one end constructed to engage and hold the lever means at its rearwardmost position and a rider dog means at its other end adapted to be raised by any of the timer pins so as to release the lever means and thrust the thing being heated toward the doorway.

2. The device recited in claim 1 wherein the timer pins are shiftable through sleeves in the wheel, and a hinged plate means with a shiftable block adapted to make contact with any of the timer pins and force it through its sleeve so as to protrude on the opposite side of the wheel.

3. The device recited in claim 1 wherein the wheel is provided with a bore which allows its pin to be shifted therein, a movable plate on one side of the wheel with an adjustable block for forcing anyone of the timer pins through its respective bore, connecting means fixing the plate to the lever means so that the plate moves toward the wheel when the lever means is forced to its most rearward position, and a cam means adjacent one side of the wheel for forcing pins toward the other side of the wheel.

EUGENE F. TUTTLE.

REFERENCES CITED

The following references are of record in the file of this patent:

UNITED STATES PATENTS

| Number | Name | Date |
|---|---|---|
| 1,328,202 | Richardson | Jan. 13, 1920 |
| 1,492,603 | Matson | May 6, 1924 |
| 1,694,762 | Ackerman | Dec. 11, 1928 |
| 1,715,968 | Weber et al. | June 4, 1929 |
| 1,862,965 | Maragos | June 14, 1932 |
| 1,937,562 | Ginder | Dec. 5, 1933 |
| 2,105,858 | Graham | Jan. 18, 1938 |
| 2,171,510 | Stirgwolt | Aug. 29, 1939 |
| 2,201,402 | Knaust | May 21, 1940 |
| 2,232,203 | Bemis | Feb. 18, 1941 |
| 2,260,832 | Dautscher | Oct. 28, 1941 |
| 2,307,347 | Anderson | Jan. 5, 1943 |
| 2,337,117 | Lloyd | Dec. 21, 1943 |
| 2,363,169 | Fischer | Nov. 21, 1944 |